(12) United States Patent
Arie et al.

(10) Patent No.: US 7,596,256 B1
(45) Date of Patent: Sep. 29, 2009

(54) COMPUTER ASSISTED DETECTION OF LESIONS IN VOLUMETRIC MEDICAL IMAGES

(75) Inventors: Kaufman Arie, Plainview, NY (US); Dongqing Chen, Port Jefferson Station, NY (US); Jerome Liang, Stony Brook, NY (US); Mark R. Wax, Greenlawn, NY (US)

(73) Assignee: The Research Foundation for The State University of New York, Stony Brook, NY (US)

( * ) Notice: Subject to any disclaimer, the term of this patent is extended or adjusted under 35 U.S.C. 154(b) by 1488 days.

(21) Appl. No.: 10/246,070

(22) Filed: Sep. 16, 2002

Related U.S. Application Data

(60) Provisional application No. 60/322,046, filed on Sep. 14, 2001.

(51) Int. Cl.
*G06K 9/00* (2006.01)
(52) U.S. Cl. ...................................... 382/131; 382/128
(58) Field of Classification Search ......... 382/128–132; 345/419, 424
See application file for complete search history.

(56) References Cited

U.S. PATENT DOCUMENTS

| | | | |
|---|---|---|---|
| 4,367,216 A | 1/1983 | Mutzel et al. | |
| 4,391,280 A | 7/1983 | Miller | |

(Continued)

FOREIGN PATENT DOCUMENTS

| | | |
|---|---|---|
| WO | 9613207 | 5/1996 |
| WO | 9811524 | 3/1998 |
| WO | 9837517 | 8/1998 |
| WO | 0055812 | 9/2000 |
| WO | 0055814 | 9/2000 |

OTHER PUBLICATIONS

Hong et al., "3D Virtual Colonoscopy," 1995 Biomedical Visualization Proceedings, pp. 26-32 and 83 (1995).

(Continued)

*Primary Examiner*—Matthew C. Bella
*Assistant Examiner*—Patrick Edwards
(74) *Attorney, Agent, or Firm*—Dorsey & Whitney LLP (57) ABSTRACT

A computer-assisted detection method is provided for detecting suspicious locations of lesions in the volumetric medical images. The method includes steps of features extraction and fusion. The first step is computing gradient feature for extraction of the layer of Partial Volume Effect (LPVE) between different tissues that related to specific organs. The LPVE will combine with the result of voxel classification to fulfill the task of tissue classification. After tissue classification, the contour of tissue boundary is determined. The gradient feature is also used to determine the direction that intensity changes. This direction that intensity changes most dramatically serves as the normal vector for voxel on the contour of the tissue boundary. The second step is to determine a local surface patch on the contour for each voxel on the contour. A local landmark system is then created on that patch and the so-called Euclidean Distance Transform Vector (EDTV) is computed based on those landmarks. The EDTV is the basic shape feature for lesion detection whose development and invasion results abnormal shape change on the tissue boundary. A vector classification algorithm for pattern recognition based on EDTVs is also provided. The voxel on the contour of tissue boundary can be grouped into areas based on similar pattern to form lesion patch and local lesion volume. That area will further be analyzed for estimation of the likelihood of lesion.

18 Claims, 3 Drawing Sheets

U.S. PATENT DOCUMENTS

| | | | |
|---|---|---|---|
| 4,493,039 A * | 1/1985 | Gregory | 324/228 |
| 4,630,203 A | 12/1986 | Szirtes | |
| 4,710,876 A | 12/1987 | Cline et al. | |
| 4,719,585 A | 1/1988 | Cline et al. | |
| 4,729,098 A | 3/1988 | Cline et al. | |
| 4,737,921 A | 4/1988 | Goldwasser et al. | |
| 4,751,643 A | 6/1988 | Lorensen et al. | |
| 4,791,567 A | 12/1988 | Cline et al. | |
| 4,823,129 A | 4/1989 | Nelson | |
| 4,831,528 A | 5/1989 | Crawford et al. | |
| 4,874,362 A | 10/1989 | Wiest et al. | |
| 4,879,668 A | 11/1989 | Cline et al. | |
| 4,984,157 A | 1/1991 | Cline et al. | |
| 4,985,834 A | 1/1991 | Cline et al. | |
| 4,985,856 A | 1/1991 | Kaufman | |
| 4,987,554 A | 1/1991 | Kaufman | |
| 4,993,415 A | 2/1991 | Long | |
| 5,006,109 A | 4/1991 | Douglas et al. | |
| 5,023,072 A | 6/1991 | Cheng | |
| 5,038,302 A | 8/1991 | Kaufman | |
| 5,047,772 A | 9/1991 | Ribner | |
| 5,056,020 A | 10/1991 | Feldman et al. | |
| 5,095,521 A | 3/1992 | Trousset et al. | |
| 5,101,475 A | 3/1992 | Kaufman | |
| 5,127,037 A | 6/1992 | Bynum | |
| 5,166,876 A | 11/1992 | Cline et al. | |
| 5,170,347 A | 12/1992 | Tuy et al. | |
| 5,187,658 A | 2/1993 | Cline et al. | |
| 5,204,625 A | 4/1993 | Cline et al. | |
| 5,229,935 A | 7/1993 | Yamagishi et al. | |
| 5,245,538 A | 9/1993 | Lis | |
| 5,261,404 A | 11/1993 | Mick et al. | |
| 5,265,012 A | 11/1993 | Amans et al. | |
| 5,270,926 A | 12/1993 | Tam | |
| 5,283,837 A | 2/1994 | Wood | |
| 5,295,488 A | 3/1994 | Lloyd et al. | |
| 5,299,288 A | 3/1994 | Glassman et al. | |
| 5,322,070 A | 6/1994 | Goodman et al. | |
| 5,331,550 A * | 7/1994 | Stafford et al. | 382/128 |
| 5,345,490 A | 9/1994 | Finnigan et al. | |
| 5,361,763 A | 11/1994 | Kao et al. | |
| 5,365,927 A | 11/1994 | Roemer et al. | |
| 5,371,778 A | 12/1994 | Yanof et al. | |
| 5,442,733 A | 8/1995 | Kaufman et al. | |
| 5,458,111 A | 10/1995 | Coin | |
| 5,611,025 A | 3/1997 | Lorensen et al. | |
| 5,623,586 A | 4/1997 | Höhne | |
| 5,630,034 A | 5/1997 | Oikawa et al. | |
| 5,699,799 A | 12/1997 | Xu et al. | |
| 5,734,384 A | 3/1998 | Yanof et al. | |
| 5,782,762 A | 7/1998 | Vining | |
| 5,971,767 A | 10/1999 | Kaufman | |
| 5,986,662 A | 11/1999 | Argiro et al. | |
| 6,130,671 A | 10/2000 | Argiro | |
| 6,149,594 A * | 11/2000 | Rock et al. | 600/437 |
| 6,215,893 B1 * | 4/2001 | Leshem et al. | 382/128 |
| 6,219,059 B1 | 4/2001 | Argiro | |
| 6,272,366 B1 | 8/2001 | Vining | |
| 2001/0055016 A1 * | 12/2001 | Krishnan | 345/424 |
| 2002/0164061 A1 * | 11/2002 | Paik et al. | 382/131 |

OTHER PUBLICATIONS

Hong et al., "3D Reconstruction and Visualization of the Inner Surface of the Colon from Spiral CT Data," IEEE, pp. 1506-1510 (1997).

William E. Lorensen, "The Exploration of Cross-Sectional Data with a Virtual Endoscope," Interactive Technology and the New Health Paradigm, IOS Press, pp. 221-230 (1995).

Adam L. Penenberg, "From Stony Brook, a New Way to Examine Colons, Externally," The New York Times, p. 6 (1996).

David J. Vining, "Virtual Colonoscopy," Advance for Administrators in Radiology, pp. 50-52 (1998).

Zhou et al., "Three-Dimensional Skeleton and Centerline Generation Based on an Approximate Minimum Distance Field," The Visual Computer, 14:303-314 (1998).

Liang Z et al., "Inclusion of a priori information in segmentation of colon lumen for 3D virtual colonscopy", 1997 IEEE Nuclear Science Symposium Conference Record, pp. 1423-1427, vol. 2.

Valev et al., "Techniques of CT colongraphy (virtual colonoscopy)", Critical Reviews in Biomedical Engineering, 1999, Begall House, vol. 27, No. 1-2, pp. 1-25.

Shibolet O et al., "Coloring voxel-based objects for virtual endoscopy", IEEE Symposium on Volume Visualization, Research Triangle, Oct. 1998.

Kaufman A., Wan M., "Disobstruction of Colon Wall Collapse", Project Description, online www.cs.sunysb.edu, Jan. 1999.

Holzapfel G A, et al., "Large strain analysis of soft biological membrances: formulation and finite element analysis", Computer Methods in Applied Mechanics and Engineering, vol. 132, No. 1-2, pp. 45-61, 1996.

Kaye J. et al., "A 3D virtual environment for modeling mechanical cardiopulmonary interactings", CVRMED-MRCAS '97, pp. 389-398, 1997.

Burgard W. et al., "Active mobile robot localization by entrophy minimization", Proceedings second euromicro workshop on advanced mobile robots, pp. 155-162, 1997.

Suya You et al., "Interactive volume rendering for virtual colonoscopy", Proceedings Visualization '97, pp. 433-436, 571.

Pai D.K. et al., "Multiresolution Rough Terrain Motion Planning", IEEE Transactions on Robotics and Automatic, vol. 14, No. 1, pp. 19-33, 1998.

Hagen H. et al., "Methods for Surface Interrogation", Proceedings of the Conference on Visualization, vol. CONF 1, pp. 187-193, 1990.

Chen et al., "A tree-branch searching, multiresolution approach to skeletonization for virtual endoscopy", 2000.

Liang Z. et al., "Feasibility Studies on Extracting Bladder Wall from MR Images for Virtual Cystoscopy", 2000.

Chen et al., "Virtual Laryngoscopy: Feasibility Studies by CT and MRI", IEEE Medical Imaging Conference, Nov. 1999.

Chen et al., A multi-scan MRI-based virtual cystoscopy, 2000.

Chen et al., "MRI-Based Virtual Cystoscopy: The image segmentation and visualization", SPIE Conference, Feb. 12-18, 2000.

Chen et al., "A Fast Algorithm to Generate Centerline for Virtual Colonscopy", SPIE Conference, Feb. 12-18, 2000.

Richard Robb, "Virtual (Computed) Endoscopy: Development and Evaluation Using the Visible Human Datasets", Oct. 7-8, 1996. www.mayo.edu.

I. Bitter et al., "Penallized-Distance Volumetric Skeleton Algorithm", IEEE Transactions on Visualization and Computer Grpahics, vol. 7, No. 3, Jul.-Sep. 2001, pp. 195-206.

M. Wan et al., "Distance-Field Based Skeletons for Virtual Navigation", *Visualization 2001*, San Diego, CA, Oct. 2001.

M. Sato et al., "An automatic colon segmentation for 3D virtual colonoscopy", IEICE Trans. Information and Systems, vol. E84-D, No. 1, Jan. 2001, pp. 201-208.

D. Chen et al., "A Novel Approach to Extract Colon Lumen from CT Images for Virtual Colonoscopy" IEEE Transactions on Medical Imaging, vol. 19, No. 12, Dec. 2000, pp. 1220-1226.

M. Wax et al., "Virtual Colonoscopy—CT Contrast Agent", Second International Symposium on Virtual Colonoscopy, Boston, MA, Oct. 2000.

K. Kreeger, et al., "Volume Rendering for Vitual Colonoscopy on an Affordable PC", Second International Symposium on Virtual Colonoscopy, Boston, MA, Oct. 2000.

S. Lakare et al., "3D Digital Cleansing Using Segmentation Rays", IEEE Visualization 2000 Conference Proceedings, ACM/SIGGRAPH Press, pp. 37-44, Oct. 2000.

S. Lakare et al., "Automated Pre-navigation processing for Virtual Colonoscopy", Second International Symposium on Virtual Colonoscopy, pp., Oct. 2000.

K. Kreeger et al., "Perspective Virtual Endoscopy with VolumePro Parallel Rendering", Center for Visual Computing and Department of Computer Science, pp. 1-8, 2000.

D. Chen et al. "A tree-branch searching, multi-resolution approach to skeletonization for visual endoscopy", SPIE Medical Imaging 2000, Feb. 2000.

M. Wan et al., "3D Vitual Colonoscopy with Real-time Volume Rendering", SPIE Medical Imaging 2000, Feb. 2000.

M. Wax et al., "Advancing Virtual Colonoscopy to Practice", International Workshop on 3D Imaging and Virtual Endoscopy, Feb. 2000.

W. Li et al., "Virtual Colonoscopy Powered by VolumePro", pp. 1-13, 1999.

M. Wan et al., "Volume Rendering Based Interactive Navigation within the Human Colon", IEEE Visualization '99 conference, San Francisco, CA, Oct. 1999, pp. 397-400.

R. Chiou et al., "Interactive Fly-Path Planning Using Potential Fields and Cell Decomposition for Virtual Endoscopy", IEEE Trans. Nuclear Sciences, vol. 46, No. 4, Aug. 1999, pp. 1045-1049.

D. Chen et al., "MR Imaging and Segmentation of the Colon Wall for Virtual Colonscopy", Soc. Magn. Reson. Medicine, vol. 3, pp. 2203, 1999.

R. Chiou et al., "Volume Segmentation and Rendering of Mixtures of Materials for Virtual Colonoscopy", SPIE Medical Imaging '99, Feb. 1999, pp. 133-138.

Z. Liang et al., "On Segmentation of Colon Lumen for Virtual Colonoscopy", SPIE Medical Imaging, Feb. 1999, pp. 270-278.

Z. Liang et al., "Virtual Endoscopy in Early Detection of Cancers", Biomedical Imaging Symposium: Visualizing the Future of Biology and Medicine, Washington, D.C., Feb. 1999.

R. Chiou et al., "Unified Analysis, Modeling, Matching and Synthesis for CT Color Texture Mapping from the Visible Human Dataset", The Second Visible Human Project Conf., Bethesda, MD, Oct. 1998.

M. Wan et al., "Boundary Cell-Based Acceleration for Volume Ray Casting", Computer & Graphics, vol. 22, No. 6, 1998, pp. 715-721.

R. Chiou et al., "Interactive Path Planning for Virtual Endoscopy", Conf. Record IEEE NSS-MIC, Nov. 1998.

M. Wax et al., "Electronic Colon Cleansing for Virtual Colonoscopy", Presentation at the first Int'l. Conf. on Virtual Colonoscopy, Boston, MA, Oct. 1998.

L. Hong et al., "Virtual Voyage: Interactive Navigation in the Human Colon", Proc. ACM SIGGRAPH '97, Aug. 1997, pp. 27-34.

A. Viswambharan et al., "Virtual Colonoscopy: Three-dimensional Reconstruction of the Mucosal Surface of the Colon", Conf. of Radiological Society of North America (RSNA), Dec. 1996, pp. 565 (Scientific Merit Award).

L. Hong et al., "Physically-Based Interactive Navigation", Technical Report TR.96.01.09, Computer Science Department, SUNY at Stony Brook, Jan. 1996.

L. Hong et al., "Visible Human Virtual Colonoscopy", Conference of National Library of Medicine Visible Human Project, Oct. 1996, pp. 29-30.

80th Scientific Assembly and Annual Meeting Nov. 27-Dec. 2, 1994, Radiology Society of North America Founded in, InfoRAD Exhibits.

\* cited by examiner

COMPUTER ASSISTED DETECTION OF LESIONS IN VOLUMETRIC MEDICAL IMAGES

RELATED APPLICATIONS

This application claims the benefit of U.S. Provisional Application Ser. No. 60/322,046, entitled "Advanced Navigation and Detection for Virtual Examination," which was filed on Sep. 14, 2001.

FIELD OF THE INVENTION

The present invention relates generally to Computer-Assisted Detection (CAD) and in particular, to a CAD method for automatically detection of lesion in the volumetric medical images.

BACKGROUND OF THE INVENTION

Techniques for acquiring medical image data, rendering 3D models of an object from such data and allowing an operator to view the virtual object are well known. For example, U.S. Pat. No. 6,343,936 to Kaufman et al. entitled "System and Method for Performing a Three Dimensional Virtual Examination, Navigation and Visualization" discloses such systems and methods. Virtual colonoscopy is an important application for such systems. The ability to have the colon interior examined using a non-invasive medical imaging method as opposed to conventional invasive techniques will make the procedure more widely used and will lead to early detection of cancerous polyps in a larger number of cases. In this regard, the '936 patent discloses a method of detecting polyps within a colon lumen. The disclosure in the '936 patent presents an initial method for effectively detecting polyps. It is expected that improvements in such techniques are desirable to further improve the results of automatic polyp detection.

SUMMARY OF THE INVENTION

The present invention is directed to a computer-based method for automatically detecting abnormal lesions in volumetric medical images. The method includes the steps of features extraction and fusion. The first step is computing gradient feature for extraction of the layer of Partial Volume Effect (LPVE) between different tissues that relate to specific organs. The LPVE is combined with the result of voxel classification to provide tissue classification. After tissue classification, the contour of the tissue boundary is determined. The gradient feature is also analyzed to determine the direction that intensity changes. The direction that intensity changes most dramatically is selected as the normal vector for the voxels on the contour of the tissue boundary.

The second step is to determine a local surface patch on the contour for each voxel on the contour. A local landmark system is created on the patch and a Euclidean Distance Transform Vector (EDTV) is then computed based on those landmarks. The EDTV is substantially independent of the image coordinate system and is substantially invariant to translation and rotation. The EDTV is the basic shape feature for lesion detection. A vector classification algorithm for pattern recognition based on EDTVs is also provided. The voxels on the contour of tissue boundary can be grouped into areas based on similar patterns to form lesion patch and local lesion volume. That area can be further analyzed to estimate of the likelihood of a lesion.

These and other features and advantages of the present invention will become apparent from the following detailed description of preferred embodiments, which is to be read in connection with the accompanying drawings.

BRIEF DESCRIPTION OF THE DRAWINGS

FIGS. 4A and 4B are pictorial diagrams demonstrating the resulting layer of partial volume effect that is determined by thresholding of the gradient feature value.

DETAILED DESCRIPTION OF PREFERRED EMBODIMENTS

The present invention is directed to a computer assisted diagnostic (CAD) method for automatically detecting suspicious lesions in volumetric medical images. A general overview of the present invention is shown in the flow chart of FIG. 1, which is a flow diagram illustrating the generation of a list of suspicious polyps from virtual colonoscopy volumetric images.

To facilitate a clear understanding of the present invention, illustrative examples are provided herein which describe the method as a sequential procedure with multiple steps for processing CT virtual colonoscopy images. However, the invention is not solely limited to applications in this way. It is to be appreciated that the invention may be used in any kind of combination of those invented techniques and may be used for any organ related lesion detection procedure. Moreover, the present invention is equally applicable to other modality of images unless there exist intensity difference between tissue of interest and its surrounding tissues.

The basic steps of the present method include the extraction of the contour of a virtual object, such as a colonic lumen, perform geometry feature analysis for the contour, detect suspicious regions, such as polyps based on geometry features, analysis of other features on the polyp volume, and the estimation of likelihood that a suspicious region relates to a real polyp.

Figure 1:
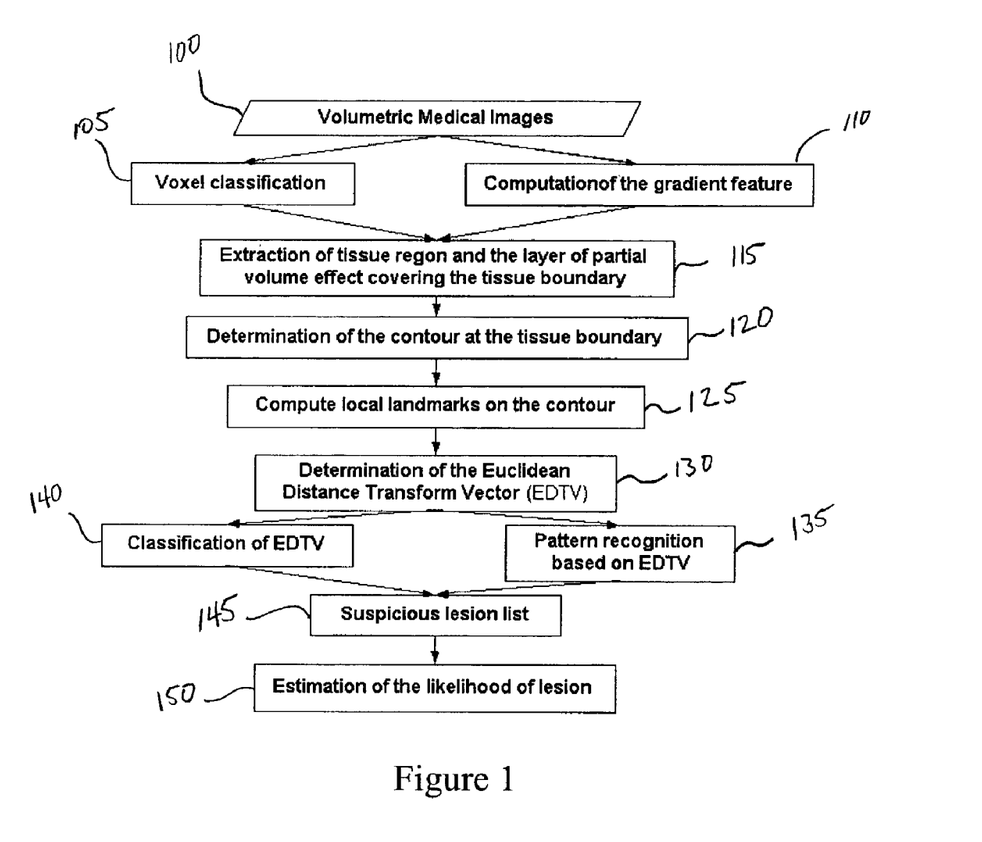
FIG. 1 is a flow diagram illustrating a method for generating a list of suspicious regions, such as polyps from volumetric images, such as used in virtual colonoscopy, according to an embodiment of the present invention.

Referring to FIG. 1, volumetric image data is acquired by processing conventional medical image data, such as MRI or CT data (step 100). Methods of acquiring volumetric image data and extracting the colon lumen as a virtual object from such data are well known and are described, for example, in U.S. Pat. No. 6,343,936 to Kaufman et al. entitled "System and Method for Performing a Three Dimensional Virtual Examination, Navigation and Visualization," ("the '936 patent") which is hereby incorporated by reference in its entirety.

The volumetric image data is subjected to voxel classification (step 105). In the case of virtual colonoscopy, the colon can be insufflated with air or $CO_2$ during image scanning. The remaining residual stool and fluid in the colon is usually tagged in higher intensity. As described in the '936 patent, the intensities of air, soft tissue, and tagged stool/fluid are in ascending order respectively with approximate 500 HU difference from each other in image intensity. This intensity difference enables differentiation of these materials. However, the boundary between the regions may be slowly varying due to partial volume effects. The range of partial volume effect depends on both the width of collimation and the image resolution, i.e., voxel size in image data. Moreover, the intensity may be blurred due to noise. Therefore, more sophisticated voxel classification, such as described in the '936 patent or in U.S. Pat. No. 6,331,116 ("'116 patent"), which is hereby incorporated by reference in its entirety, may be desired. The method disclosed in the '116 patent classifies each voxel based on its local intensity vector.

In addition to voxel classification, a gradient feature for the voxels in the volumetric image data is also calculated (step 110). The gradient feature is defined as the directional first-order derivative. In the digital image data, voxels are located on a discrete integer grid. Generally, the grid has different step lengths along different coordinate directions due to variations of the scanning parameters. The present method calculates the gradient feature in a manner which is adaptive to the anisotropic voxel size as well as to the layer of partial volume effect (LPVE), which depends on both collimation and the voxel size of CT images. Usually, the larger the collimation is, the larger the range of partial volume effects. On the other hand, the gradient feature should describe the shape variation at that point.

Figure 2:
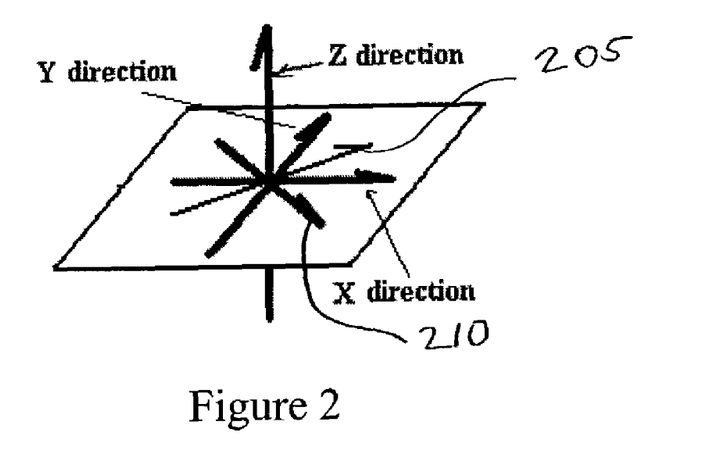
FIG. 2 is a pictorial diagram illustrating an example of how directional derivatives are computed according to an embodiment of the present invention.

For each voxel in the volumetric image data, five directional derivatives are calculated, as illustrated in FIG. 2 which shows the five directions. The X, Y, and Z are the orthogonal axial directions of the image grid coordinate system. The other two directions, depicted by arrows 205, 210 are the diagonal directions on the X-Y plane. The current directional derivative computation is designed for spiral CT images, where the Z-direction often has longer step length than those of X and Y-directions. If CT image data is acquired by multi-slice CT with isotropic voxel size, the derivatives along diagonal directions in the X-Z and Y-Z planes should also be considered.

Figure 3:
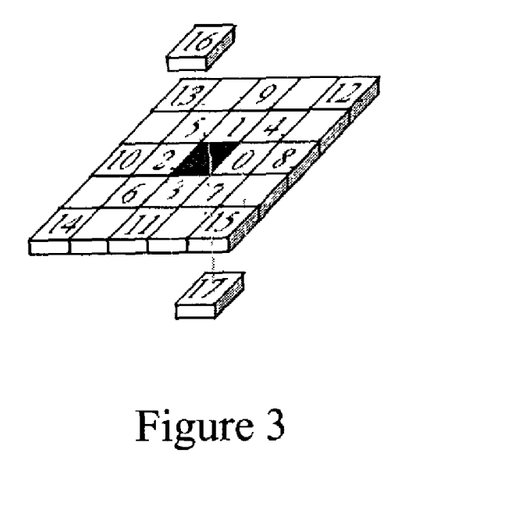
FIG. 3 is a schematic diagram illustrating the neighborhood of voxels for computing directional derivatives according to an embodiment of the present invention.

The calculation of first-order derivatives is described in the following expressions. Let $X_1$ be the intensity of i-th neighbor voxels and denote $Y=\{y_i: i=1, 2, \ldots, 5\}$, the vector of directional derivatives. Equation 1 shows how to calculate the Y values. The neighborhood is defined in FIG. 3. The numbers referred to in the subscript notation refer to the voxel positions in the neighborhood as illustrated in FIG. 3.

$$y_1 = |x_{12} - 18x_4 + 18x_6 - x_{14}|/(12 * \lambda_{xy}),$$

$$y_2 = |x_9 - 18x_1 + 18x_3 - x_{11}|/(12 * \lambda_y), y_3 = |x_{13} - 18x_5 + 18x_7 - x_{15}|/(12 * \lambda_{xy}),$$

$$y_4 = |x_{10} - 18x_2 + 18x_0 - x_8|/(12 * \lambda_x) \quad (1)$$

$$y_5 = |x_{16} - x_{17}|/(2 * \lambda_z)$$

where $\lambda_*$ is the step length along direction "*." In Equation 1, the central-5-point formula is employed as an example, however, the invention is not limited to this embodiment. Any other suitable formula can be utilized to calculate the first-order derivative and account for voxel size.

Figure 4A:
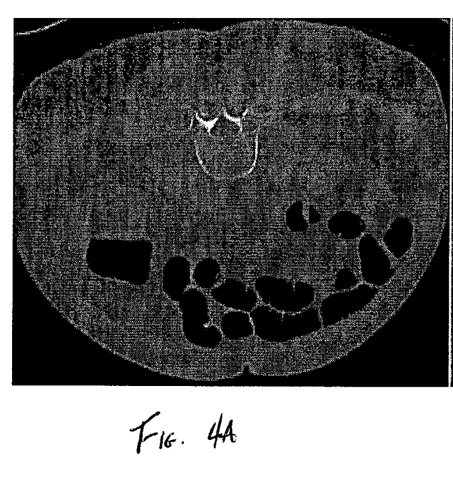
FIG. 4A is the original CT slice image and FIG. 4B is the GFV result.
Figure 4B:
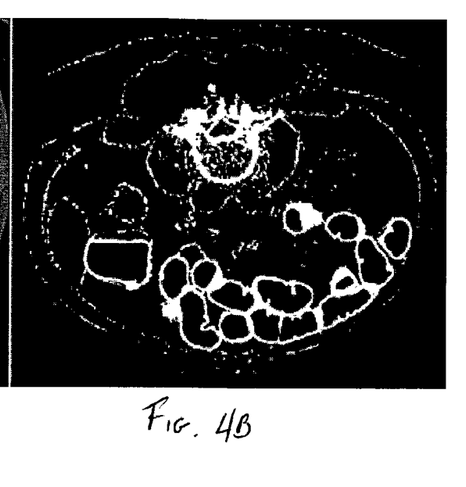

The maximum value among the absolute values of the directional derivatives of equation 1 is defined as the Gradient Feature Value (GFV). By thresholding the GFV, the LPVE can be separated from the tissue homogeneous regions since the homogeneous region has a much lower GFV compared to the tissue boundary, where the intensity dramatically changes. The threshold can be pre-set for a specific application. In the present invention as applied to virtual colonoscopy CT images, a threshold of about 50 has been found to be useful. In other words, if the GFV of a voxel is larger than 50, it is in the LPVE. FIG. 4B shows an example of a thresholding result for a virtual colonoscopy CT slice image of FIG. 4A.

From the voxel classification of step 105 and the gradient feature of step 110, various tissue regions as well as the layer of partial volume effect (LPVE) between regions is extracted in step 115.

The determination of the LPVE can be fused with that of the voxel classification to determine the region of the colon lumen and the colonic wall layer. There are several voxel classification methods applicable to this application. In one embodiment, the self-adaptive vector quantization algorithm, which is disclosed in U.S. Pat. No. 6,331,116, was used. The GFV represents the intensity change at a given location. The voxel classification addresses the intensity homogeneity. By combining GFV thresholding and voxel classification, more reliable and complete information can be obtained. Moreover, the partial volume effect can be considered in an appropriate way. This convergence is referred to herein as Intensity-Gradient Hybrid Segmentation (IGHS). The segmentation result of IGHS is the LPVE around the homogeneous tissue region. The layer of partial volume effects may be more than several voxels thick. The one-voxel-thick shell of the layer that is connected to the colon lumen is referred to herein as the Contour Of the Colonic Lumen (COCL) (step 120).

Figure 5:
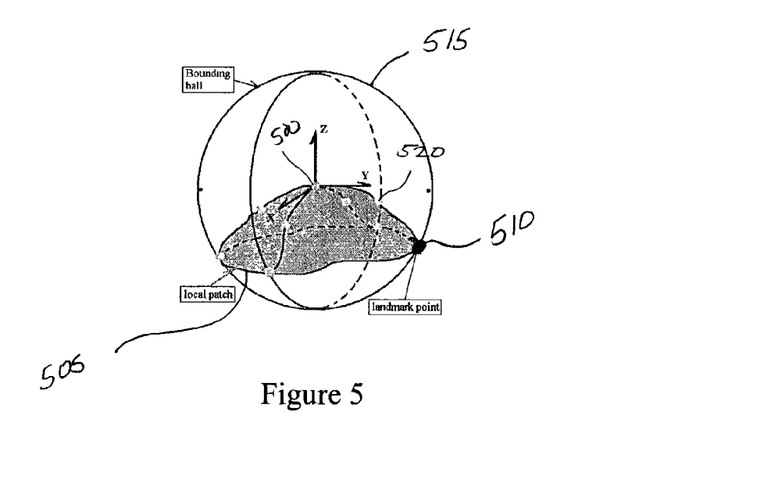
FIG. 5 is a schematic diagram showing an example of local coordinate system on the contour of tissue boundary.

For each voxel on the COCL, the direction in which intensity changes most dramatically is determined. Referring to FIG. 5, this direction is defined by the normal vector Z at that location and the normal vector always points to the lumen. A 3D bounding ball 515 with its center 500 at the voxel on the COCL and radius R mm can be determined at this location. The R should be setup to be adaptive to the feature size of the polyps. For example, we can set R=6 mm. The area on the COCL confined by the bounding ball that connects to the current voxel is then delineated. This area is the local patch 505 associated with the current voxel 500. There exists a direction perpendicular to the normal vector Z that has the longest length projected on the COCL within the bounding ball. This direction can be designated as the X vector and along with the normal can define a local (right-hand) the third vector, or Y vector, of a coordinate system for the current voxel. For clear understanding, let the direction be the X, the normal be the Z, and the Y direction is determined by right hand rule based on X and Z. FIG. 5 illustrates an example of such a local coordinate system.

In step 125, the contour of the regions of interest are evaluated and a set of local landmarks for the local patch contour are determined. As illustrated in FIG. 5, the XY, XZ, and YZ planes intersect the COCL within the bounding ball. That results in two curved segments on the COCL within the bounding ball. The two curves segments intersect at the current voxel. For each segment, an additional point 520 is located which has equal curve length to both the segment's end voxel and the current voxel. The current voxel 500, the 4 ends of the segments 510, and the 4 center points on the segments 520 form the Local Landmark System (LLS) for the current voxel on the COCL (See FIG. 5). There are 9 landmarks in total. The landmarks characterize the basic shape information of the COCL at the current voxel. However, the coordinates of the landmarks depend on the coordinate system. The number of landmarks can be chosen adaptive to the polyp feature size and the resolution of image. It is not necessary for the number of landmarks to be equal to 9. The more landmarks that are used, the more accurate they represent the local shape. However, the use of more landmarks may cause great computational burden in later processing steps.

In step 130, the landmarks can be used to compute a Euclidean Distance Transform Vector (EDTV). The EDTV consists of the set of all distances between any pair of landmarks in a predetermined order. For example, when nine landmarks (number 1 through 9) are used, a 3-dimensional EDTV results, which includes the distances between landmarks 1-2, 1-3, 1-4, 1-5, 1-6, 1-7, -1-8, 1-9, 2-3, 2-4, 2-5, 2-6, 2-7, 2-8, 2-9, 3-4, 3-5, 3-6, 3-7, 3-8, 3-9, 4-5, 4-6, 4-7, 4-8, 4-9, 5-6, 5-7, 5-8, 5-9, 6-7, 6-8, 6-9, 7-8, 7-9 and 8-9. The order in which the distances are determined among the landmarks is not critical so long as the order is known and is repeatable. Since the elements of EDTV are relative distances, the EDTV is independent to the coordinate system and is invariant to translation and rotation. This allows the EDTV to be a good shape feature vector.

The EDTV provides a geometric representation of the region of interest which can be used in classification (step 140) and pattern recognition (step 135). A polyp library can be created based on a training set of EDTV. The training set is a set of 3-dimensional EDTVs that are extracted from available polyp samples in the virtual colonoscopy images. Any known feature extraction algorithm can be applied to the training set to classify the training EDTVs into several typical clusters and the representative EDTV for each cluster is generated. One solution is to use principal component analysis. The representative EDTVs serve as a template for all kinds of local shapes associated with possible polyps. This library can be updated as more EDTVs related to polyps are obtained. The feature extraction procedure can also apply on a training set that includes EDTVs related to both polyp and normal colon wall/fold. In that case, the representative EDTVs for the normal wall/fold can also be created.

The current invention detects suspicious polyp locations in virtual colonoscopy images based on the EDTV. When a new set of image data is acquired, the colon lumen and the LPVE are determined first. Then, the COCL is delineated. Following that, the EDTV is calculated for all voxels on the COCL. The distances between each EDTV and those representative EDTVs in the library are computed. The minimum distance is than determined. If the minimum distance is less than or equal to a pre-set threshold, the current voxel is associated to a suspicious polyp. Otherwise, the current voxel is associated with a normal colon wall. The threshold is created by finding out the minimum distance between those EDTV of normal wall and those representative EDTV.

The suspicious voxels on the COCL can be further grouped based on a nearest distance rule. In other words, if the distance between two suspicious voxels is less than a threshold, they are considered as related to the same polyp. The distance threshold is determined by the voxel size, i.e., the image resolution. For example, for a 0.7×0.7×1.0 mm$^3$ voxel size, the distance can be set as 1.5 mm. After grouping of suspicious voxels, the area on the COCL that is related to the same polyp is dilated to a thickness of 1.5 mm to create a contiguous surface area on the COCL. The contiguous surface area is the so-called Polyp Patch (PP).

Each location which may be a polyp is processed to estimate the likelihood of the region representing a polyp (step 150). Each patch is associated with a suspicious polyp location. Then, the smallest parallelepiped volume of voxels that contain the PP is determined and is used as the polyp volume. The geometry features of volume, such as the size, the volume, the diameter, etc. can be computed. Further feature analysis can be applied to the polyp volume. For example, texture analysis as disclosed in U.S. Pat. No. 5,971,676, which is hereby incorporated by reference in its entirety, can be used to further analyze a suspicious region. Moreover, multiple feature analysis can be applied and their results are further fused to estimate the likelihood that the volume covers a polyp. A list of all suspicious regions is created in step 145. The list of suspicious polyps can be sorted in a number of ways depending on user preference. For example, the list can be sorted in descending order of likelihood or the list can be sorted in the descending order of size of the polyp volume.

The suspicious region list is provided to the display equipment where the user interface is running. The user can interactively sort the polyps in the list based on different features. The PP is coded with specific color to remind the reviewer when he/she navigates inside the colon lumen. When the user confirms a polyp in the list, the associated EDTVs of that PP will automatically be stored for further polyp library improvement.

All the features can further be transformed into a format for rendering in the 3D view to facilitate detection. This is the so-called virtual biopsy.

What is claimed is:

1. A computer assisted method for identifying suspicious regions in volumetric image data of a virtual object comprised of a plurality of voxels, the method comprising the steps:
   determining a contour of a virtual object;
   selecting a voxel on a contour of the tissue boundary of the virtual object;
   defining a local patch on the contour about the selected voxel;
   defining a plurality of local landmarks on the local patch with respect to the selected voxel;
   computing a Euclidean distance transform vector for the plurality of local landmarks;
 estimating the likelihood of abnormality by evaluating the Euclidean distance transform vector;
   wherein the step of computation of the Euclidean distance transform vector comprises the steps of:
     determining a local coordinate system for the selected voxel;
     computing the distance between each of said landmarks with respect to the local coordinate system; and
   wherein the step of determining the local coordinate system comprises steps of:
     determination of the maximum directional derivative and computation of a direction vector denoted as Z;
     defining a bounding ball having an origin at the selected voxel and a predetermined radius,
     determining the local patch on the contour associated with the selected voxel based on the intersection of the contour by the bounding ball;
     defining an X vector by computing the largest direction within the bounding ball that is perpendicular to Z for the local patch; and
     adding at least a Y direction vector that is mutually orthogonal to the X vector and Z vector to construct the local coordinate system.

2. The computer assisted detection method as set forth in claim 1 wherein the step of determining the contour of tissue boundary comprises the steps of:
   extracting the layer of partial volume effect that covers a boundary of different tissue or material;
   classifying voxels based on its local intensity vector; and
   extracting the contour of tissue boundary via gradient and intensity hybrid segmentation.

3. The computer assisted method as set forth in claim 2, wherein the step of extracting the layer of partial volume effect further comprises:

determining the gradient feature of the virtual object; and thresholding the gradient feature.

4. The computer assisted method as set forth in claim 2 wherein the step of voxel classification comprises the steps of extracting local intensity vector and vector quantization on the series of local intensity vectors.

5. The method as set forth in claim 2 wherein the step of extraction of the contour of tissue boundary comprises fusing the gradient feature and voxel classification to perform tissue segmentation.

6. The method of claim 1 wherein the direction of third direction vector is aligned with respect to X and Y based on the right-hand rule.

7. The method as set forth in claim 1 wherein the step of delineating the local landmarks comprises of steps of:
   determining local curve segments associated with the selected voxel on the local patch; and
   sampling uniform curve-lengths on the curve segments to obtain landmark points associated to the current voxel.

8. The method as set forth in claim 1 wherein the step of computing the Euclidean distance transform vector comprises computing distances between any pair of landmark points that are associated to a certain voxel on the contour.

9. The method as set forth in claim 1 further comprising the steps of defining a polyp volume based on the local patch.

10. The method as set forth in claim 1, further comprising the step of constructing a lesion library having a plurality of Euclidean distance transform vectors associated with polyps stored therein.

11. The method as set forth in claim 10 wherein the step of constructing the lesion library comprises of the steps:
   collecting a training set of lesion-related Euclidean distance transform vectors;
   applying feature extraction to the training set;
   determining a feature type for the Euclidean distance transform vectors; and
   adding the representative feature vector for each type as member of the library.

12. The method as set forth in claim 11 wherein the step of determining the feature type of the Euclidean distance transform vector further comprises the computation of the distances between the current vector and all those representative vectors in the library and relating the selected voxel to a lesion if the minimum distance is less than a certain threshold value.

13. The method as set forth in claim 12 wherein relating the selected voxel to a lesion further comprises grouping lesion-related voxels together based on a minimum spatial proximity.

14. The method as set forth in claim 13, further comprising the step of forming a lesion patch by determining the single connected surface area on the contour of tissue boundary based on the groups of lesion related voxels.

15. The method of claim 14 further comprising determining the volume each of the single connected surface areas representing a suspicious lesion patch and determining an estimated associated polyp volume as the volume of the smallest parallelepiped volume that covers the patch.

16. The method as set forth in claim 1 wherein the step of estimation of likelihood of abnormality comprises the steps of:
   multiple features analysis on lesion volume; and
   fusion of multiple feature analysis results to estimate likelihood of lesion.

17. The method as set forth in claim 16 wherein the step of multiple feature analysis on lesion volume comprises of texture feature analysis, geometry feature analysis, and patient specific anatomical feature analysis.

18. The method as set forth in claim 16 wherein the step of fusion of multiple feature analysis comprises Bayesian network estimation of the likelihood of lesion.

\* \* \* \* \*

UNITED STATES PATENT AND TRADEMARK OFFICE
CERTIFICATE OF CORRECTION

PATENT NO. : 7,596,256 B1
APPLICATION NO. : 10/246070
DATED : September 29, 2009
INVENTOR(S) : Arie Kaufman et al.

It is certified that error appears in the above-identified patent and that said Letters Patent is hereby corrected as shown below:

Title page, item [75]  Reads
In "Inventors"  "Kaufman Arie"

Should Read
"Arie Kaufman"

ALSO

Col. 1, line 14  Should Read
"This invention was made with government support under grant number CA082402 awarded by the National Institute of Health and grant number MIP952694 awarded by the National Science Foundation. The government has certain rights in the invention."

Signed and Sealed this

Seventeenth Day of November, 2009

David J. Kappos
*Director of the United States Patent and Trademark Office*